United States Patent
Kassab

(10) Patent No.: US 11,655,732 B2
(45) Date of Patent: May 23, 2023

(54) TURBINE EXHAUST CASE MIXER

(71) Applicant: PRATT & WHITNEY CANADA CORP., Longueuil (CA)

(72) Inventor: Rabih Kamal Kassab, Montréal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/320,389

(22) Filed: May 14, 2021

(65) Prior Publication Data

US 2022/0364477 A1 Nov. 17, 2022

(51) Int. Cl.
*F01D 25/24* (2006.01)

(52) U.S. Cl.
CPC ........... *F01D 25/243* (2013.01); *F01D 25/24* (2013.01); *F05D 2220/32* (2013.01); *F05D 2240/14* (2013.01)

(58) Field of Classification Search
CPC ............ F01D 25/243; F05D 2240/127; F05D 2260/38; F05D 2260/52; F02K 1/04; F02K 1/386; F02K 1/80
See application file for complete search history.

(56) References Cited

U.S. PATENT DOCUMENTS

| | | | |
|---|---|---|---|
| 2,877,623 A * | 3/1959 | Klompas | F01D 25/243 60/39.5 |
| 4,074,914 A * | 2/1978 | Novotny | F16L 23/02 415/214.1 |
| 4,226,085 A | 10/1980 | Johnson | |
| 6,584,766 B1 | 7/2003 | Czachor | |
| 7,805,925 B2 | 10/2010 | Durocher et al. | |
| 10,760,527 B2 | 9/2020 | Lefebvre et al. | |
| 10,801,441 B2 | 10/2020 | Summers-Lepine et al. | |
| 2015/0143813 A1 * | 5/2015 | Salunkhe | F01D 25/162 415/108 |
| 2015/0337761 A1 * | 11/2015 | Marini | F01D 9/041 415/144 |

FOREIGN PATENT DOCUMENTS

| FR | 1254006 A | * | 2/1961 | |
|---|---|---|---|---|
| FR | 2900979 A1 | * | 11/2007 | ............... B64C 7/02 |

* cited by examiner

*Primary Examiner* — Courtney D Heinle
*Assistant Examiner* — Danielle M. Christensen
(74) *Attorney, Agent, or Firm* — Norton Rose Fulbright Canada LLP

(57) ABSTRACT

The turbine exhaust case (TEC) mixer assembly for an aircraft engine includes a center body including a hub that encloses a center body cavity and has a first wall portion and a second wall portion that are axially spaced apart. The first and second wall portions having axial end segments which are removably coupled to each other radially inwardly from the outer periphery of the center body via a fixing arrangement including a fastener that is enclosed within the center body cavity. An axial spring includes a gap axially defined between portions of the axial end segments and located at the outer periphery of the center body. A mixer extends peripherally about the center body and is spaced radially outward from the hub by a plurality of struts extending between the hub and the mixer, the plurality of struts being axially offset from the gap at a strut-hub interface.

17 Claims, 4 Drawing Sheets

FIG_1

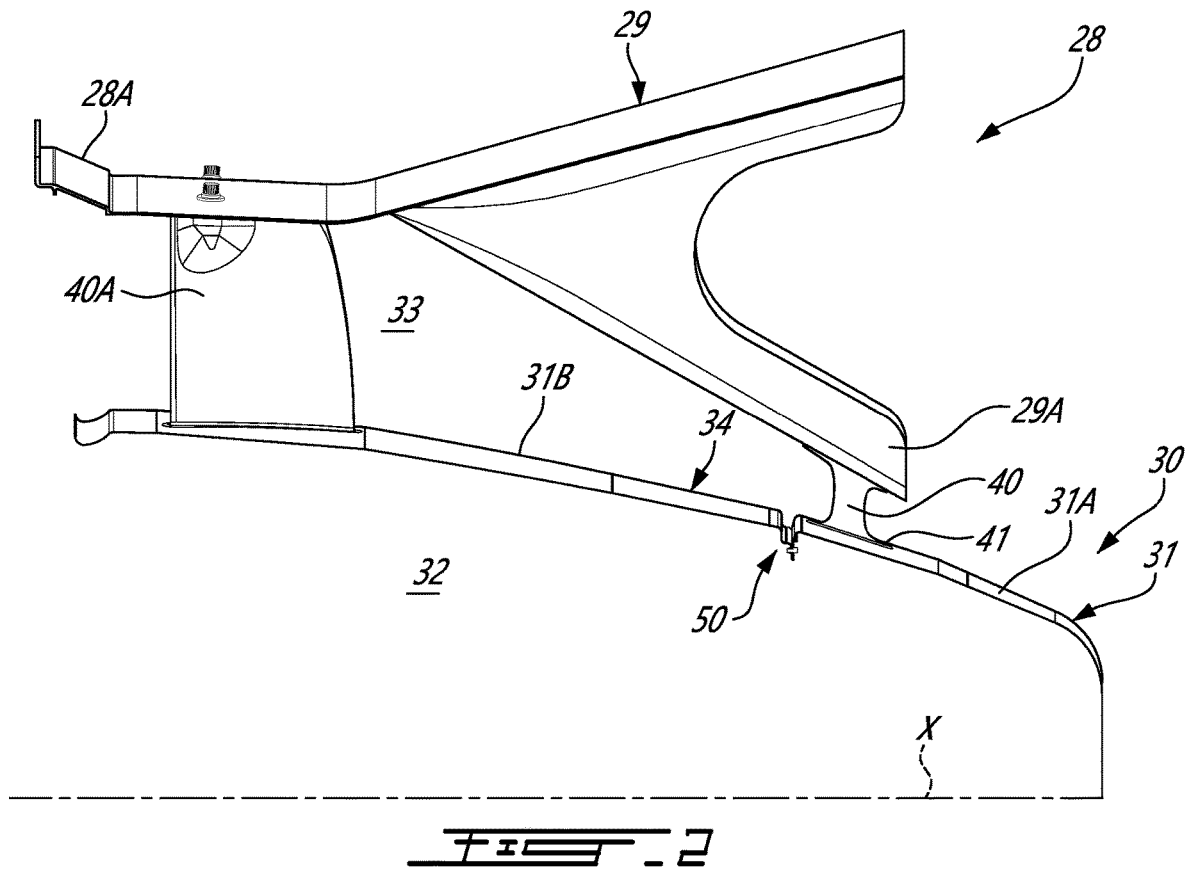
FIG. 2
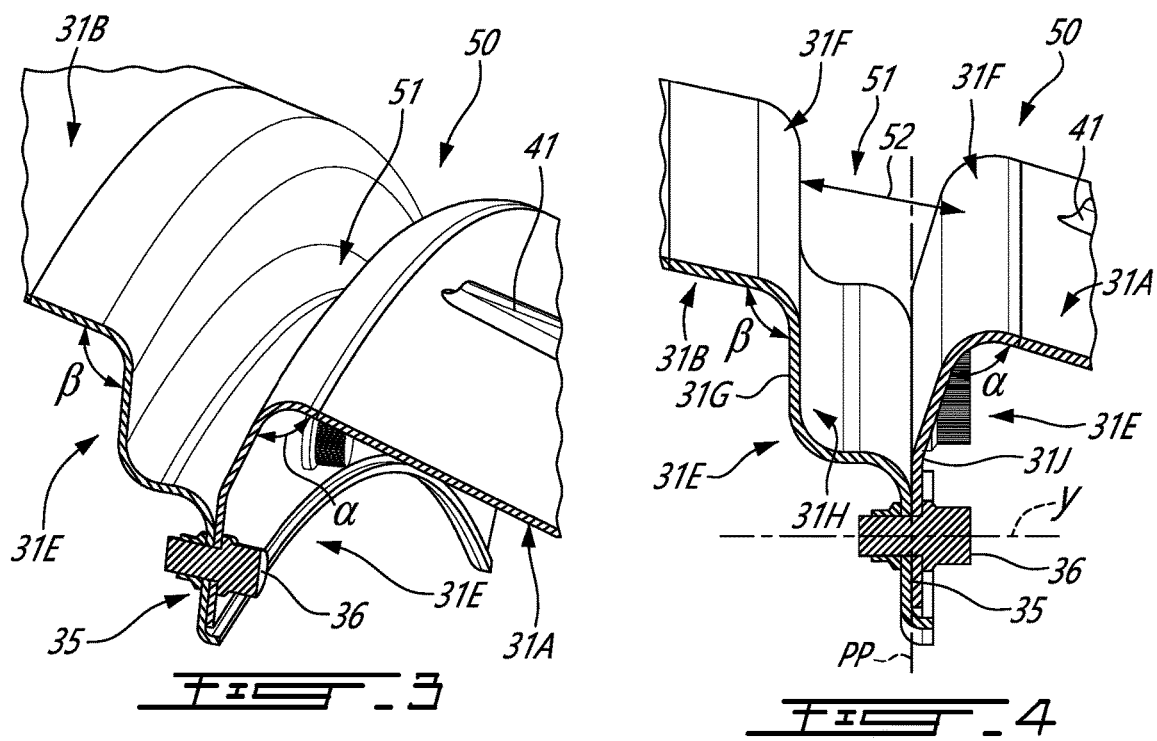
FIG. 3
FIG. 4

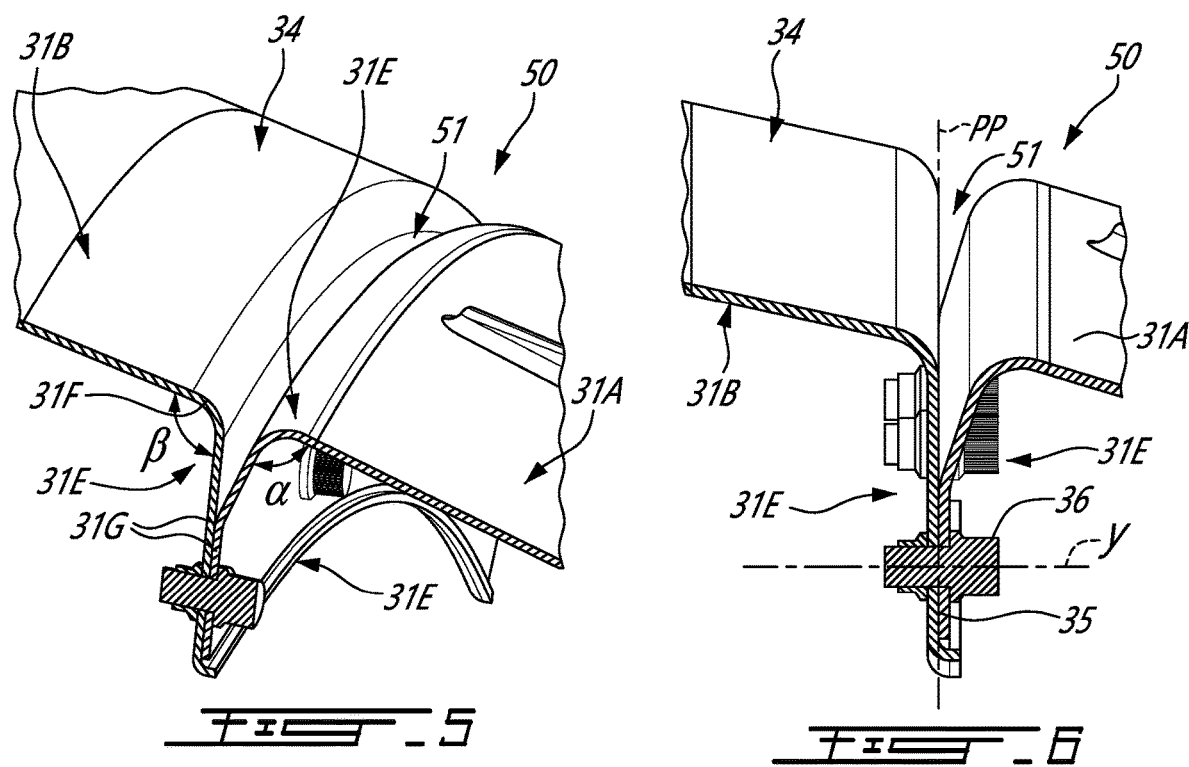
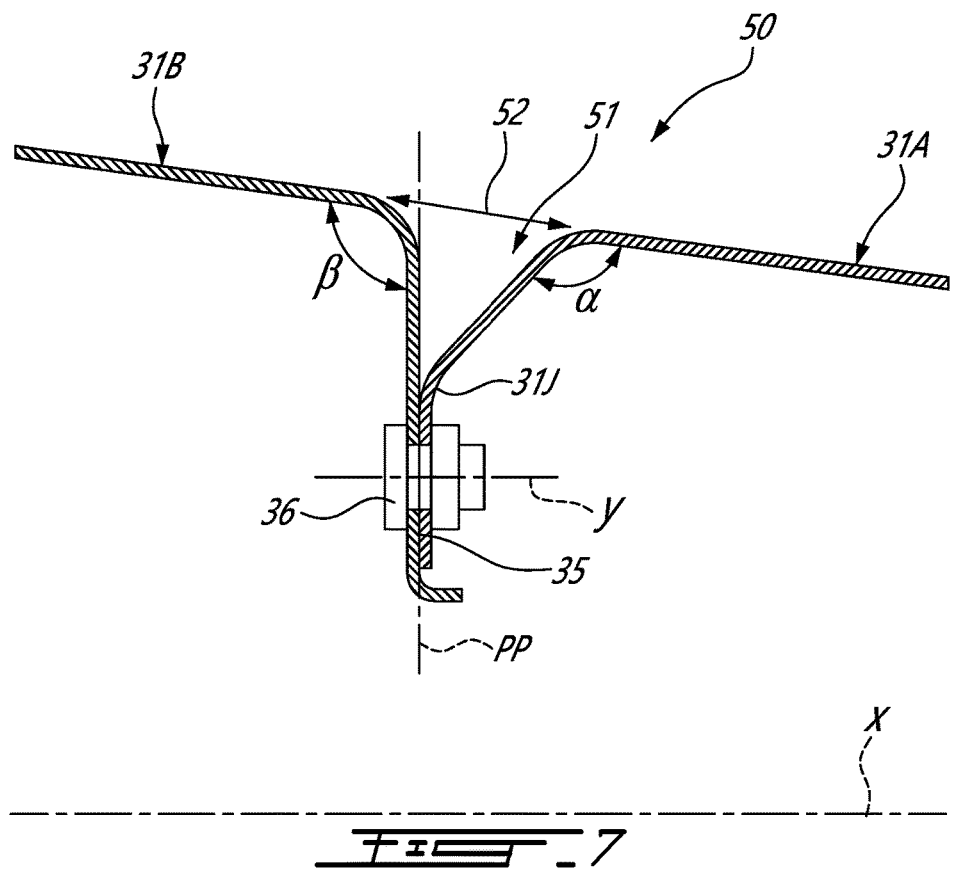

TURBINE EXHAUST CASE MIXER

TECHNICAL FIELD

The disclosure relates generally to exhaust sections of turbofan aircraft engines and, more particularly, to turbine exhaust case (TEC) and mixers assemblies.

BACKGROUND

In turbofan engines, hot gases exhausted from the engine core mix with cooler bypass air flowing through an annular bypass duct surrounding the engine core. The turbine exhaust gasses from the engine core and the bypass airstream from the bypass duct are mixed together, before expulsion through a single nozzle. In order to perform the mixing function, mixers have been coupled to the downstream end of a shroud of the turbine exhaust case (TEC).

Typically, such TEC include a radially inner center body or inner hub to which a mixer may be connected through struts. The large temperature gradients to which TEC and mixers are exposed can cause their respective components to undergo significant thermal cycling (thermal expansion and shrinkage). Interconnected components of the TEC and mixers may undergo thermal expansion and/or shrinkage differentials, as a result of their respective interaction with hot exhaust gases and/or cold air. Thermal cycling differential between components may cause thermal stress and/or limit the lifespan of such components. Additionally, components within existing TEC mixers may be difficult to access for installation or repair purposes.

SUMMARY

In one aspect, there is provided a turbine exhaust case (TEC) mixer assembly for an aircraft engine, comprising: a center body extending along a central axis of the TEC mixer assembly, the center body including a hub, the hub at least partially enclosing a center body cavity and having a first wall portion and a second wall portion axially spaced apart from the first wall portion, the first wall portion and the second wall portion together defining an outer periphery of the center body, the first wall portion and the second wall portion each having a respective axial end segment, the axial end segment of the first wall portion and the axial end segment of the second wall portion removably coupled to each other radially inwardly from the outer periphery of the center body via a fixing arrangement including at least one fastener, the at least one fastener enclosed within the center body cavity; an axial spring including a gap axially defined between portions of the respective axial end segments of the first wall portion and the second wall portion, the gap defined at the outer periphery of the center body; and a mixer extending peripherally about the center body and spaced radially outward from the hub by a plurality of struts extending between the hub and the mixer, the plurality of struts axially offset from the gap at a strut-hub interface.

In another aspect, there is provided a turbine exhaust case (TEC) mixer assembly for an aircraft engine, comprising: a mixer extending circumferentially about a central axis of the TEC mixer assembly; a center body extending along the central axis, the center body spaced radially inward from the mixer, the center body including a hub, the hub coupled to the mixer by a plurality of struts extending between the hub and the mixer, the hub at least partially enclosing a center body cavity, the hub having a first hub section and a second hub section disposed axially along the central axis, the first hub section and the second hub section defining an outer periphery of the center body; an axial spring axially offset from the plurality of struts on the outer periphery of the center body, the axial spring including a first part and a second part defining a gap therebetween, the gap extending at least partially circumferentially about the outer periphery, the axial spring deformable to allow axial contraction and/or expansion of the gap; and a fixing arrangement removably coupling the first hub section and the second hub section to each other, the fixing arrangement including at least one fastener engaging the first hub section and the second hub section, the at least one fastener enclosed within the center body cavity.

BRIEF DESCRIPTION OF THE DRAWINGS

Reference is now made to the accompanying figures in which:

FIG. 2 is a schematic cross-sectional view of a magnified portion of an exhaust section of the aeroengine of FIG. 1, according to an embodiment;

FIG. 3 is a partially-sectioned perspective view of a portion of a turbine exhaust case (TEC) of the exhaust section of FIG. 2;

FIG. 4 is a magnified, partially-sectioned perspective view of the portion of the TEC of the exhaust section of FIG. 3;

FIG. 5 is a partially-section perspective view of the portion of the TEC of the exhaust section of FIG. 2, according to an embodiment;

FIG. 6 is a magnified, partially-sectioned perspective view of the portion of the TEC of the exhaust section as shown in FIG. 5;

FIG. 7 is a schematic cross-sectional representation of the magnified cross-sectional view of FIG. 6.

DETAILED DESCRIPTION

Figure 1:
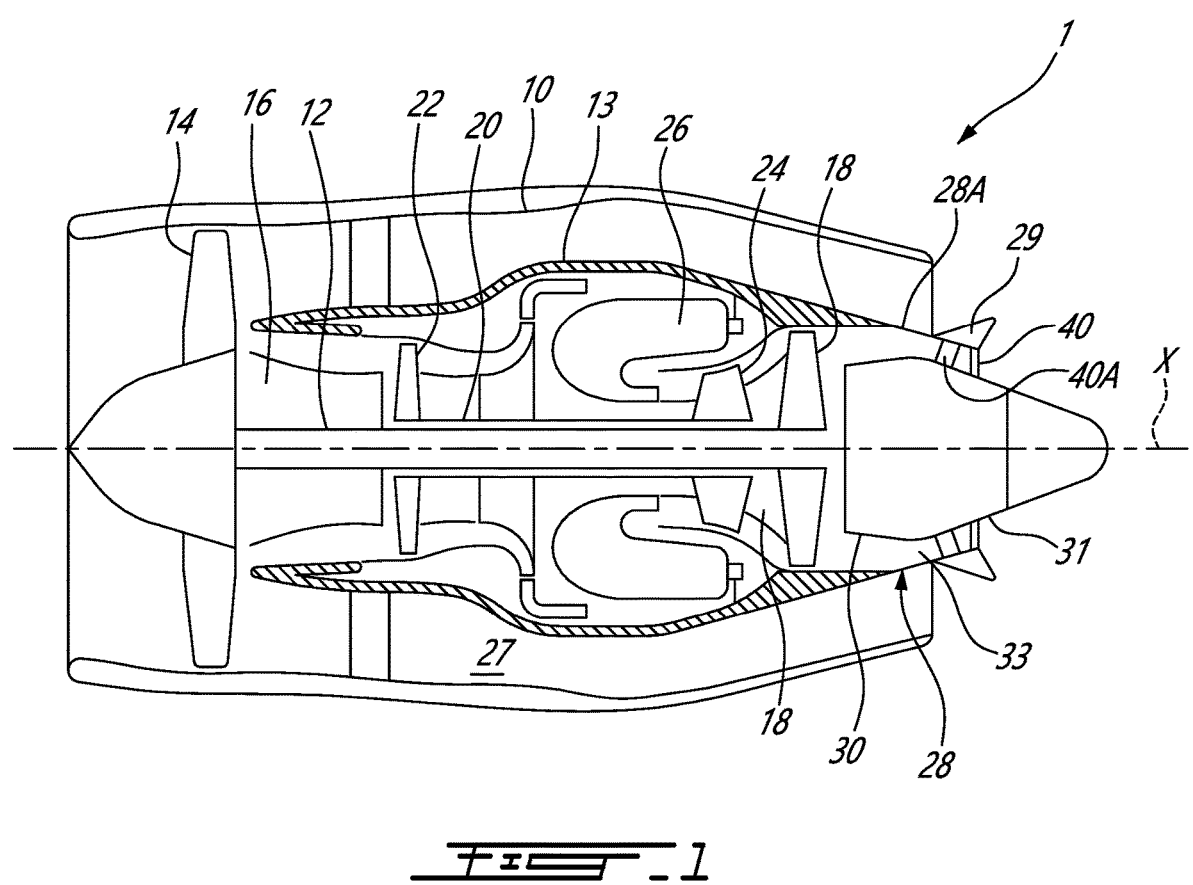
FIG. 1 is a schematic cross-sectional view of an exemplary turbofan aeroengine.
Figure 8:
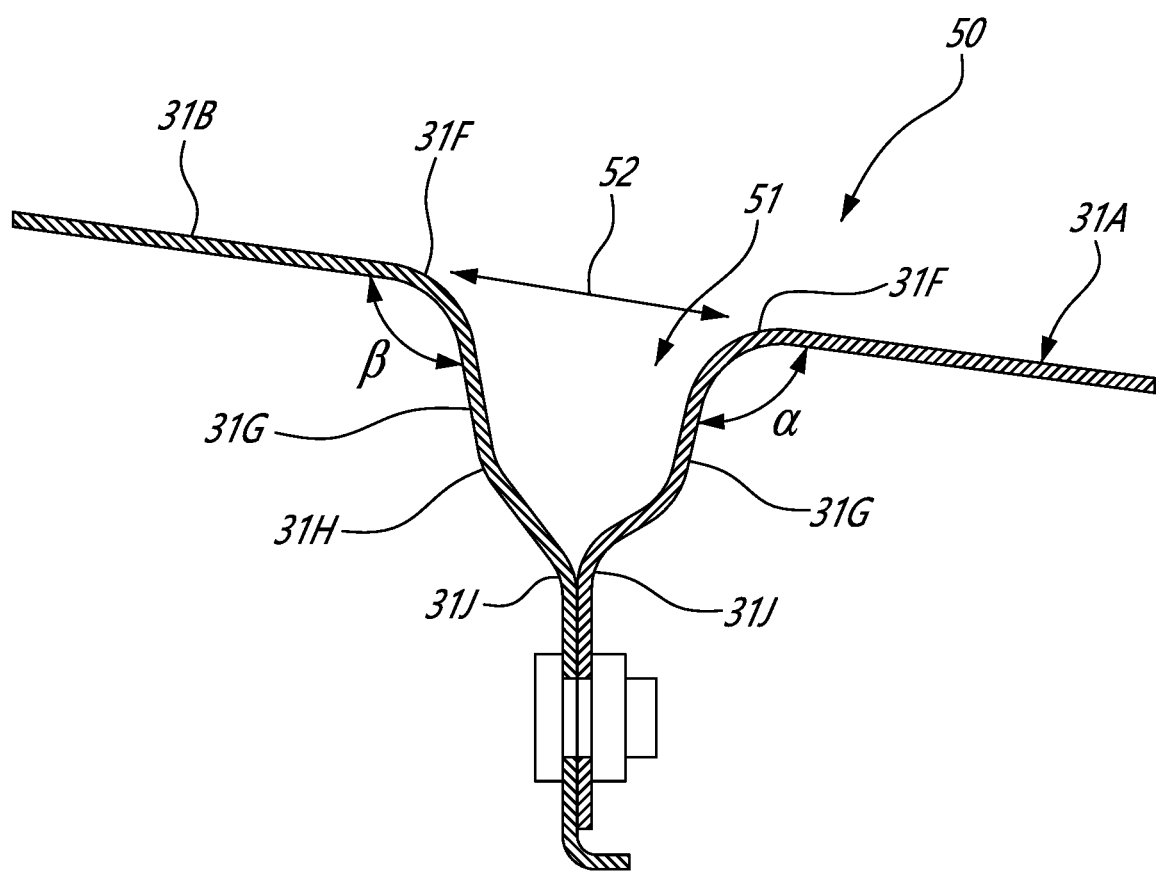
FIG. 8 is a schematic cross-sectional representation of the magnified cross-sectional view of FIG. 6, according to an embodiment.

FIG. 1 illustrates an exemplary turbofan aeroengine 1 (also referred to herein as an "aircraft engine") which includes a nacelle 10, a core casing 13, a low pressure spool assembly seen generally at 12 which includes a fan assembly 14, a low pressure compressor assembly 16 and a low pressure turbine assembly 18, and a high pressure spool assembly seen generally at 20 which includes a high pressure compressor assembly 22 and a high pressure turbine assembly 24. The core casing 13 surrounds the low and high pressure spool assemblies 12 and 20 in order to define a main gas path (not numbered) therethrough. In the main gas path there is provided a combustion chamber 26 in which a combustion process produces combustion gases to power the high and low turbine pressure assemblies 24 and 18. A turbine exhaust case (TEC) 28 is provided at a downstream end of the core casing 13 and a mixer 29 is coupled to a downstream end of the TEC 28 for mixing hot exhaust gases discharged from the high and low pressure turbine assemblies 24, 18, with a bypass airstream driven by the fan assembly 14 through an annular bypass duct 27 which is defined radially between the nacelle 10 and the core casing 13.

Referring to FIG. 1, the TEC 28 and the mixer 29 define a common central axis X which in the embodiment shown superposes a central rotation axis of the aeroengine 1. The mixer 29 may have in at least some embodiments an annular wavy configuration around the central axis X which may axially extend between an upstream end and a downstream end of the mixer 29. The mixer 29 may include inner and outer circumferential flow surfaces extending between the upstream and downstream ends of the mixer 29. The inner and outer flow surfaces may be in a circumferentially wavy or twisted annular configuration to thereby form a plurality of lobes 29A (see FIG. 2) of the mixer 29. The lobes 29A may be axially extending or axially straight and may define a plurality of alternating crests and valleys, as described in U.S. Pat. No. 9,759,159, the entire contents of which are hereby incorporated herein by reference.

The TEC 28 has a center body 30 in an exhaust section, or downstream end, of the aeroengine 1. The center body 30 includes an annular hub 31 (or simply "hub 31"). The hub 31 encloses a center body cavity 32 (or simply "cavity 32"). The center body cavity 32 is surrounded at least partially (or entirely) by the hub 31. In the depicted embodiment, the center body 30 has a generally conical shape. The hub 31 may be referred to as an exhaust cone in some embodiments. The TEC 28 may include an annular shroud 28A (or simply "shroud 28A"). The annular mixer 29 (or simply "mixer 29") may be coupled to a downstream end of the shroud 28A. The mixer 29 could be considered a part of the shroud 28A in some cases. In the depicted embodiment, the shroud 28A and the mixer 29 surround the hub 31 to form an annular exhaust gas duct 33 disposed radially therebetween.

It should be noted that the terms "upstream" and "downstream" used herein and hereinafter refer to the direction of a gas flow passing through the main gas path of the engine. It should also be noted that the terms "axial", "radial" and "circumferential" are used with respect to the central axis X. Although the TEC 28 and the mixer 29 are described as separate components, the mixer 29 may be considered as part of the TEC 28, or stated differently, the assembly of the TEC 28 and the mixer 29 may be referred to as a TEC and mixer (or "TEC mixer") assembly for convenience.

Referring to FIGS. 2-4, according to an embodiment, the hub 31 has at least two separate hub sections 31A, 31B removably coupled to each other. The hub sections 31A, 31B define an outer periphery 34 of the center body 30. As shown, the sections 31A, 31B are axially disposed along the central axis X relative to each other. The hub sections 31A, 31B may be referred to as axial sections of the hub 31 because of their relative axial position.

As shown at least in FIG. 2, the hub sections 31A, 31B define walls of the exhaust gas duct 33. Such walls or wall portions of the exhaust gas duct 33, which may also be referred to as wall portions of the hub 31 may be in direct contact with the exhaust gas flow within the exhaust gas duct 33. In the depicted embodiment, these hub sections 31A, 31B define the outer periphery 34 of the center body 30. The hub sections 31A, 31B (or wall portions of the hub 31) may respectively define an upstream end portion and a downstream end portion of the center body 30. In other words, the hub sections 31A, 31B or wall portions of the hub 31 may form at least part of an external "envelope" of the center body 30. The hub 31 may have more than two axial sections, even though only the two sections 31A, 31B adjacent to each other are identified herein by reference numbers.

The hub sections 31A, 31B are coupled to each other. The hub sections 31A, 31B have respective axial end segments 31E. As shown, the axial end segment 31E of the hub section bearing the reference 31A and the axial end segment of the hub section bearing the reference 31B engage each other at a coupling interface 35. In the depicted embodiment, the coupling interface 35 is defined along opposing surfaces of those axial end segments 31E, with such surfaces extending circumferentially about the central axis X. The axial end segments 31E are removably coupled to each other at such coupling interface 35 radially inward from the outer periphery 34 of the center body 30 via a fixing arrangement.

Referring to FIGS. 3-4, in an embodiment, the fixing arrangement includes a plurality of fasteners 36 to removably couple the hub sections 31A, 31B. The fasteners 36 may be circumferentially spaced about the outer periphery 34 of the center body 30, about the central axis X, whether equally spaced or not. The fasteners 36 may be clips, rivets, bolts, screws, in at least some embodiments. Other fixing arrangement may include, for instance, a single fastener, such as a ring (e.g. clamp ring, lock ring, etc.).

In the depicted embodiment, the fasteners 36 extend through the axial end segments 31E of the hub sections 31A, 31B. As shown, each of the fasteners 36 has a fastener longitudinal axis Y which extend in a direction parallel to the central axis X. In other embodiments, the fasteners 36 may have their respective fastener longitudinal axes Y at a relative angle with the central axis (e.g. acute angle, such as ±30 degrees, or even less, such as ±10 degrees).

A plurality of struts 40 are circumferentially spaced about the central axis X. The struts 40 extend radially across the annular exhaust gas duct 33 and interconnect the mixer 29 and the hub 31 of the TEC 28. In at least some embodiments, the struts 40 are respectively coupled to at least some of the plurality of the lobes 29A of the mixer 29. There may be a second group of struts, as shown at 40A extending radially across the annular exhaust gas duct 33 and interconnecting the mixer 29, or the shroud 28A at the downstream end of the core casing 13 to which the mixer 29 may be coupled, and the hub 31. As shown in FIGS. 1-2, such second group of struts 40A are upstream of the struts 40. Such struts 40, 40A may be referring to as deswirling struts and may have a cambered profile so as to deswirl the swirling flow of exhaust gases and mix the exhaust gases with the bypass air stream, as described in U.S. Pat. No. 9,759,159.

At least the struts 40 are coupled to the hub 31 at respective strut-hub interfaces 41. As shown in FIG. 2, the struts 40 (here only one strut shown due to the cross-section, but it should be understood that a circumferential array of such struts 40 are present) are coupled to one of the hub sections 31A, 31B, and the struts 40A are coupled to the other one of the hub sections 31A, 31B. The coupling of the hub sections 31A, 31B is upstream of the struts 40. As shown, the coupling of the hub sections 31A, 31B is located axially between the struts 40 and the struts 40A along the outer periphery 34 of the center body 30. In embodiments where the struts 40 may be angled in an axial direction, the coupling of the hub sections 31A, 31B may be upstream of at least the strut-hub interface 41. Separation of the hub sections 31A, 31B at such location may provide greater accessibility to the strut-hub interfaces 41, for access, repair, maintenance, or quality control purposes. The struts 40 and the hub 31 may be welded at the strut-hub interfaces 41. Other fixing may be contemplated, such as rivets, bolts, co-molding, etc. In embodiments where the struts 40 are welded to an outer surface of the hub 31 at respective strut-hub interfaces 41, removably coupling the hub sections 31A, 31B may provide greater accessibility during the assembly of the TEC 28, for welding and/or quality control of the welds (or other coupling) at the strut-hub interfaces 41, for instance.

The struts 40A may also be coupled to the hub 31 in a similar manner as the struts 40 and hub 31 at the strut-hub interfaces 41. In at least some embodiments, the struts 40 are respectively coupled to at least some of the plurality of the lobes 29A of the mixer 29. Coupling may be by welding, rivets, bolts, co-molding, etc. The struts 40A may be coupled to the mixer 29 or annular shroud 28A of the downstream end of the core casing 13 (FIG. 1) to which the mixer 29 may be coupled in a similar manner.

During operation of the aeroengine 1, the TEC mixer assembly undergoes thermal cycling, which may be due at least to the interaction of the hot exhaust gases coming out through the exhaust gas duct 33 and the bypass airstream coming out through the annular bypass duct 27. Such thermal cycling may occur at a different rate depending on the components and placement of such components relative to such hot exhaust gases and bypass airstream. More specifically, there may be a thermal expansion/shrinkage differential between the mixer 29 and the hub 31, which are coupled to each other by the struts 40. It may be desired to compensate for such thermal expansion/shrinkage differential between the hub 31 and the mixer 29 interconnected at least by the struts 40.

The TEC 28 includes an axial spring 50 deformable to allow thermal contraction and/or expansion of the hub 31 at least in an axial direction. The axial spring 50 forms a thermal joint between the hub sections 31A, 31B, in that it is capable of absorbing thermal expansion differentials, in at least the axial direction, between the axial sections 31A, 31B of the hub 31. The axial spring 50 is axially offset from the struts 40 on the outer periphery 34 of the center body 30. The axial spring 50 is located upstream of the struts 40, at least at their strut-hub interfaces 41, which extend between the hub 31 and the outer lobes 29A of the mixer 29. In at least some cases, the lobes 29A may be radially deformable, for instance due to their thickness and/or the curved shape of the lobes. As such, the lobes 29A of the mixer 29 may take up at least part of the thermal expansion differential in a radial direction.

The axial spring 50 is defined by the respective axial end segments 31E of the hub sections 31A, 31B. In an embodiment, at a portion of the axial end segments 31E of the hub sections 31A, 31B, the axial spring 50 defines a gap 51 or recess in the outer periphery 34 of the center body 30. The gap 51 is defined between a first part and a second part of the axial spring 50, which may be portions of the respective axial end segments 31E of the hub section 31A, 31B. The gap 51 extends at least partially peripherally (peripherally and/or circumferentially) about the outer periphery 34 of the center body 30. In one embodiment, the gap 51 may extend uninterrupted about the full perimeter and/or circumference of the outer periphery 34. In another embodiment, however, the gap 51 may be circumferentially interrupted, in that it may include a number of circumferentially spaced apart gaps which collectively define the gap 51. In the embodiment shown, the gap 51 has a generally U-shape when viewed in a cross-sectional plane containing the central axis X, as that of FIG. 4. The gap 51 may also have a different shape, such as a V, Y or U shape, or a combination of these gap shapes. The end segments 31E define opposing (in the axial direction) walls of the gap 51. The end segments 31E define respective bends 31F angled radially inwardly and respective radially inwardly extending flanges 31G from the bends 31F. During thermal cycling, the gap 51 may expand or contract axially (in an orientation of the central axis X). The bends 31F may deform to allow the gap 51 to expand or retract axially. The bends 31F each form a bend angle α, β. At least one, if not both, of such angles α, β may be greater than 90 degrees in a non-deformed state in at least some embodiments, such as shown in FIGS. 2-8. This may facilitate the manufacturing of the end segments 31E. Such bend angle(s) α, β may be between 90 and 150 degrees in at least some embodiments. The gap 51 has an axial dimension or width 52 which may be measured as a distance between the axial end segments 31E (walls of the gap 51) along the outer periphery 34 of the centre body 30 (as shown in FIG. 4), and which may vary while the end segments 31E deform under thermal load.

As shown, the width 52 of the gap 51 reduces in a radially inward direction, to the point where the end segments 31E define the coupling interface 35 radially inward from the gap 51. The bends 31F may deform to allow the gap 51 to expand or contract axially, as discussed above. In the depicted embodiment, both bend angles α, β are greater than 90 degrees in a non-deformed state. In the depicted embodiment, the flange 31G of one of the end segments 31E (see left side in FIG. 4) defines a rounded concave corner 31H in the wall of the gap 51 before the coupling interface 35 begins at an end of the flange 31G. The coupling interface 35 may be sized so as to minimize the length of the flange 31G. For instance, the coupling interface 35 may be sized along the plane PP, described in more detail below, so as to provide just enough clearance for a tool to engage the fasteners 36 during assembly, without or with limited interference between the tool and the hub section(s) 31A, 31B.

The shape, bend angles α, 13, material type and wall thickness of the end segments 31E may influence the axial spring rate K of the axial spring 50, for instance. In at least some embodiments, the axial end segments 31E have respective bending stiffnesses K1, K2, which may be measured by applying and monitoring a force on the axial end segments 31E in a direction parallel to the central axis X. The stiffness K (or spring rate) of the axial spring 50 may correspond to (K1*K2)/(K1+K2).

As discussed above, the end segments 31E are coupled to each other at the coupling interface 35 via a fixing arrangement, which is in the embodiment shown a plurality of fasteners 36. The coupling interface 35 is radially inward relative to the gap 51. The coupling interface 35 extends in a plane PP intersecting with the central axis X. In the depicted embodiment, the plane PP in which the coupling interface 35 extends is normal to the central axis X, although it may be otherwise transverse thereto in other embodiments. In the depicted embodiment, the plane PP intersects with the gap 51. The coupling interface 35 is flat, at least where the fasteners 36 are located. The coupling interface 35 may not be entirely flat, such that part of the coupling interface 35 may not extend within the plane PP in some embodiments. For instance, the coupling interface 35 could be defined at least in part by curved surfaces, or flat surfaces not entirely extending in one plane such as the plane PP. The coupling interface 35 may vary in dimension(s), e.g. radial dimension, about the central axis X. For instance, the coupling interface 35 may have a reduced or varying dimensions between adjacent fasteners 36.

As shown, the fasteners 36 intersect with the plane PP and/or the coupling interface 35. The fasteners 36 extend through the end segments 31E of the hub sections 31A, 31B at the coupling interface 35. In the depicted embodiment, the fasteners 36 are enclosed within the center body cavity 32. That is, the fasteners 36 are surrounded, or within, the center body cavity 32. The fasteners 36, as shown, are not accessible through the gap 51 (or more generally not accessible from the exhaust gas duct 33 radially thereabove). Such configuration for the fixing arrangement may permit the fasteners 36, such as bolts shown herein, to be efficiently/readily accessible from the center body cavity 32. As can be seen, with the fasteners 36 being bolts (or other similar types of fasteners) and extending through the end segments 31E of the hub sections 31A, 31B, their head ends and tip ends are both accessible from within the center body cavity 32. During assembly of the hub sections 31A, 31B, a person (and/or assembly tool) may access the coupling interface 35 from within the center body cavity 32 to assemble the hub sections 31A, 31B from within the center body cavity 32. This configuration may allow more convenient installation and removal of one hub section 31A from the other hub section 31B. In such configuration, the gap 51 is free of fasteners 36. The absence of fasteners 36 (or parts thereof) from within the gap 51 may allow a gap design with a reduced axial dimension or width 52 of the gap 51, which may limit the aerodynamic impact of the gap 51 on the exhaust gas flow within the exhaust gas duct 33.

Referring to FIGS. 5-7, a variant of the TEC 28 with an axial spring 50 as presented in FIGS. 2-4 is shown. Similar features will not be explained again, for conciseness. It should be understood from the readings of the preceding paragraphs that what was described with respect to FIGS. 2-4 also generally apply to what is shown in FIGS. 5-7. In the depicted embodiment, the end segments 31E and the coupling interface 35 is radially inward from the outer periphery 34 of the center body 30. At least the bend angle α of the end segment 31E of the hub section 31A is greater than 90 degrees (see FIG. 7). In the depicted embodiment, the plane PP in which the coupling interface 35 is defined is normal to the central axis X. However, such plane PP does not intersect with the gap 51, as the plane PP coincides with one of the walls of the gap 51 (see FIG. 7, the wall on the left side in the illustration). In such variant of the TEC with axial spring 50, the gap 51 may have an even more limited width 52 as that of the configuration shown in FIGS. 2-4. In the depicted embodiment, the flange 31G on one of the end segments 31E (e.g. left side of the illustration of FIG. 11) extends from the bend 31F radially straight down to the coupling interface 35 (radially inwardly towards the central axis X), without additional bending other than the bend 31F, such as the concave corner 31H in FIGS. 2-4, before the coupling interface 35. The gap 51 has a generally V-shape when viewed in a cross-sectional plane containing the central axis X, as that of FIG. 7. The flange 31G which extends from the bend 31F having the angle α on the opposite end segment 31E (right side of the illustration of FIG. 8) defines an additional bend 31J where the coupling interface 35 begins. This is also shown in FIGS. 2-4. In a variant of that shown in FIGS. 5-7, in FIG. 8, the flanges 31G of both end segments 31E include such an additional bend 31J to generally widen the gap 51 relative to the configuration shown in FIGS. 5-7. Also shown in the embodiment of FIG. 8, both end segments 31E have a rounded concave corner 31H in the wall of the gap 51, between the bends 31F and the additional bend 31J.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, other shapes for the end segments of the hub sections, flanges, bends, as described above may be contemplated, to define a gap and axial spring or thermal joint as contemplated herein. Yet further modifications could be implemented by a person of ordinary skill in the art in view of the present disclosure, which modifications would be within the scope of the present technology.

The invention claimed is:

1. A turbine exhaust case (TEC) mixer assembly for an aircraft engine, comprising:

a center body extending along a central axis of the TEC mixer assembly, the center body including a hub, the hub at least partially enclosing a center body cavity and having a first wall portion and a second wall portion axially spaced apart from the first wall portion, the first wall portion and the second wall portion together defining an outer periphery of the center body, the first wall portion and the second wall portion each having a respective axial end segment, the axial end segment of the first wall portion and the axial end segment of the second wall portion removably coupled to each other radially inwardly from the outer periphery of the center body via a fixing arrangement including at least one fastener, the at least one fastener enclosed within the center body cavity, the axial end segment of the first wall portion defining a bend and a flange extending from the bend radially inwardly relative to the outer periphery, the bend angularly deformable and, in a non-deformed state, having a bend angle greater than 90 degrees;

an axial spring including a gap axially defined between portions of the respective axial end segments of the first wall portion and the second wall portion, the gap defined at the outer periphery of the center body; and a mixer extending peripherally about the center body and spaced radially outward from the hub by a plurality of struts extending between the hub and the mixer, the plurality of struts axially offset from the gap at a strut-hub interface, the strut-hub interface defined downstream of the axial spring along the center body.

2. The TEC mixer assembly as defined in claim 1, wherein the at least one fastener has a fastener longitudinal axis extending in a direction parallel to the central axis.

3. The TEC mixer assembly as defined in claim 1, wherein the fixing arrangement includes a plurality of fasteners including the at least one fastener, the plurality of fasteners being circumferentially spaced about the outer periphery of the center body, the plurality of fasteners extending through the axial end segment of the first wall portion and the axial end segment of the second wall portion.

4. The TEC mixer assembly as defined in claim 1, wherein the gap has a width taken between the axial end segment of the first wall portion and the axial end segment of the second wall portion, the axial end segment of the first wall portion and the axial end segment of the second wall portion deformable so as to vary the width of the gap.

5. The TEC mixer assembly as defined in claim 1, wherein the gap has an axial dimension taken about the outer periphery of the center body in an orientation of the central axis, the axial dimension of the gap reducing in a radially inward direction.

6. The TEC mixer assembly as defined in claim 1, wherein the axial end segment of the first wall portion and the axial end segment of the second wall portion define opposing walls of the gap, the axial end segment of the first wall portion and the axial end segment of the second wall portion having respective bending stiffnesses K1, K2, a stiffness K of the axial spring corresponding to (K1*K2)/(K1+K2).

7. The TEC mixer assembly as defined in claim 1, wherein the axial end segment of the first wall portion and the axial end segment of the second wall portion engage each other at a coupling interface radially inward from the gap, at least part of the coupling interface extending in a plane intersecting with the central axis.

8. The TEC mixer assembly as defined in claim 7, wherein the plane intersects with the gap.

9. The TEC mixer assembly as defined in claim 7, wherein the plane is normal to the central axis.

10. A turbine exhaust case (TEC) mixer assembly for an aircraft engine, comprising:
 a mixer extending circumferentially about a central axis of the TEC mixer assembly;
 a center body extending along the central axis, the center body spaced radially inward from the mixer, the center body including a hub, the hub coupled to the mixer by a plurality of struts extending between the hub and the mixer, the hub at least partially enclosing a center body cavity, the hub having a first hub section and a second hub section disposed axially along the central axis, the first hub section and the second hub section defining an outer periphery of the center body, the first hub section and the second hub section having respective axial end segments;
 an axial spring axially offset from the plurality of struts on the outer periphery of the center body, the axial spring located upstream of a strut-hub interface of the plurality of struts on the outer periphery of the center body, the axial spring including a first part of the axial spring and a second part of the axial spring defining a gap therebetween, the axial end segment of the first hub section and the axial end segment of the second hub section defining walls of the gap on opposite sides of the gap, the gap extending at least partially circumferentially about the outer periphery, the axial spring deformable to allow axial contraction and/or expansion of the gap; and
 a fixing arrangement removably coupling the first hub section and the second hub section to each other, the fixing arrangement including a fastener engaging the first hub section and the second hub section, the fastener enclosed within the center body cavity; wherein
 the axial end segment of the first hub section defines a bend and a flange extending from the bend radially inwardly relative to the outer periphery, the bend angularly deformable and, in a non-deformed state, has a bend angle greater than 90 degrees.

11. The TEC mixer assembly as defined in claim 10, wherein the axial end segment of the first hub section and the axial end segment of the second hub section removably coupled to each other radially inward from the outer periphery, wherein the fastener includes a plurality of fasteners spaced about the outer periphery of the center body, the plurality of fasteners engaging the axial end segment of the first hub section and the axial end segment of the second hub section.

12. The TEC mixer assembly as defined in claim 11, wherein the axial end segment of the first hub section and the axial end segment of the second hub section define the first part and the second part of the axial spring, the axial end segments resiliently thermally deformable so as to vary an axial dimension of the gap.

13. The TEC mixer assembly as defined in claim 10, wherein the gap has a V, Y and/or U shape in a cross-sectional plane containing the central axis, the axial end segment of the first hub section and the axial end segment of the second hub section extending radially inward from the outer periphery of the center body, the axial end segment of the first hub section and the axial end segment of the second hub section engaging each other radially inward from the gap at a coupling interface, the fastener engaging the axial end segment of the first hub section and the axial end segment of the second hub section at the coupling interface.

14. The TEC mixer assembly as defined in claim 10, wherein the axial end segment of the first hub section and the axial end segment of the second hub section engage each other at a coupling interface radially inward from the gap, at least part of the coupling interface extending in a plane intersecting with the central axis.

15. The TEC mixer assembly as defined in claim 14, wherein the plane intersects with the gap.

16. The TEC mixer assembly as defined in claim 14, wherein the plane is normal to the central axis.

17. The TEC mixer assembly as defined in claim 10, wherein the mixer includes a plurality of lobes, the plurality of struts are respectively coupled to at least some of the plurality of the lobes, the plurality of struts coupled to the hub at respective strut-hub interfaces defined between the plurality of the struts and the first hub section, the plurality of struts being a plurality of first struts, the TEC mixer assembly comprising a plurality of second struts extending radially from the second hub section.

\* \* \* \* \*